(12) United States Patent
Austin

(10) Patent No.: US 7,411,501 B2
(45) Date of Patent: Aug. 12, 2008

(54) METHOD TO VERIFY OR TRACK A PHYSICAL ADDRESS WHILE PROVIDING A SERVICE

(75) Inventor: Pixie A. Austin, Marysville, WA (US)

(73) Assignee: Intermec IP Corp., Everett, WA (US)

( * ) Notice: Subject to any disclaimer, the term of this patent is extended or adjusted under 35 U.S.C. 154(b) by 159 days.

(21) Appl. No.: 11/296,805

(22) Filed: Dec. 7, 2005

(65) Prior Publication Data

US 2006/0202009 A1   Sep. 14, 2006

Related U.S. Application Data

(60) Provisional application No. 60/633,781, filed on Dec. 7, 2004.

(51) Int. Cl.
*G08B 13/14* (2006.01)

(52) U.S. Cl. .................................. 340/572.1; 340/572.4

(58) Field of Classification Search ............... 340/572.1, 340/572.4, 572.8, 568.1, 568.5, 571, 573.1, 340/573.3, 573.4, 502, 595; 235/375, 383, 235/472.02

See application file for complete search history.

(56) References Cited

U.S. PATENT DOCUMENTS

| | | | |
|---|---|---|---|
| 6,523,752 B2 * | 2/2003 | Nishitani et al. ....... | 235/462.44 |
| 6,983,194 B1 * | 1/2006 | Stadermann ................ | 700/213 |
| 6,997,253 B2 * | 2/2006 | Webb et al. ................. | 166/155 |
| 7,031,946 B1 * | 4/2006 | Tamai et al. .................. | 705/67 |
| 7,063,263 B2 * | 6/2006 | Swartz et al. .......... | 235/472.02 |

OTHER PUBLICATIONS

Krim, Jonathan, New high-tech passports not always picture-perfect, The Seattle Times, Aug. 6, 2004, p. A1.

* cited by examiner

*Primary Examiner*—Van T. Trieu
(74) *Attorney, Agent, or Firm*—Seed IP Law Group PLLC

(57) ABSTRACT

Buildings such as residences and commercial locations may have a data marker such as a barcode and/or RF device. A data marker may store/carry data indicative of an address. This allows verification of a physical address of a location and/or a name of an owner, business(es), residents, and/or employees at that location. A service provider may utilize the data marker during the provision of services. For example, when a package is to be delivered, the data marker may be scanned/interrogated for address verification and then the item may be delivered. This speeds up the tracking and delivery of goods and services. It also reduces or eliminates human error during delivery as every residence and business has an address.

30 Claims, 2 Drawing Sheets

METHOD TO VERIFY OR TRACK A PHYSICAL ADDRESS WHILE PROVIDING A SERVICE

CROSS-REFERENCE TO RELATED APPLICATION

This application claims the benefit of U.S. Provisional Application 60/633,781, filed Dec. 7, 2004.

BACKGROUND

1. Technical Field

This disclosure relates to a method to verify a location. More, specifically it relates to using a data marker to verify the physical address of a location.

2. Description of Related Art

Currently, people rely on street numbers to verify an address. If there are no street numbers at the house, building or location they are looking for, the street number is obtained by extrapolating from the known address of cross streets or nearby buildings.

An emergency call may be triangulated based on a cell phone or be traced back to a specific location based on the telephone number. However, the emergency vehicle that responds must rely on the driver's knowledge of the roads, crossroads, and posted street numbers if the address is not readily visible.

Computer programs, GPS and tracking devices exist that can identify where a car, emergency vehicle or user is located. However, these may not be accurate or there may be more than one house or building in close proximity of the desired location. A person is required to rely on the house numbers or extrapolate if numbers are missing to identify the correct location There is a need to quickly and accurately verify the address of a location.

BRIEF SUMMARY

Residences, public spaces, lots, government buildings, and commercial locations are provided with a data marker such as a barcode and/or RFID device, which may carry address information. This allows immediate verification of a physical address of a location. In addition, the data marker may contain additional information such as a name of an owner, a resident or a business at the location. Alternatively, a location may have multiple data markers.

A service provider may utilize the address information during the provision of services, for example, a UPS delivery. When a package is to be delivered at an address, a data marker at a location may be scanned/interrogated for verification of the address of the location. If the address is verified the item may be delivered.

In some embodiments, a data marker may speed up tracking and delivery of goods and services. The data marker may also reduce or eliminate human error during tracking and delivery.

DETAILED DESCRIPTION

Figure 1:
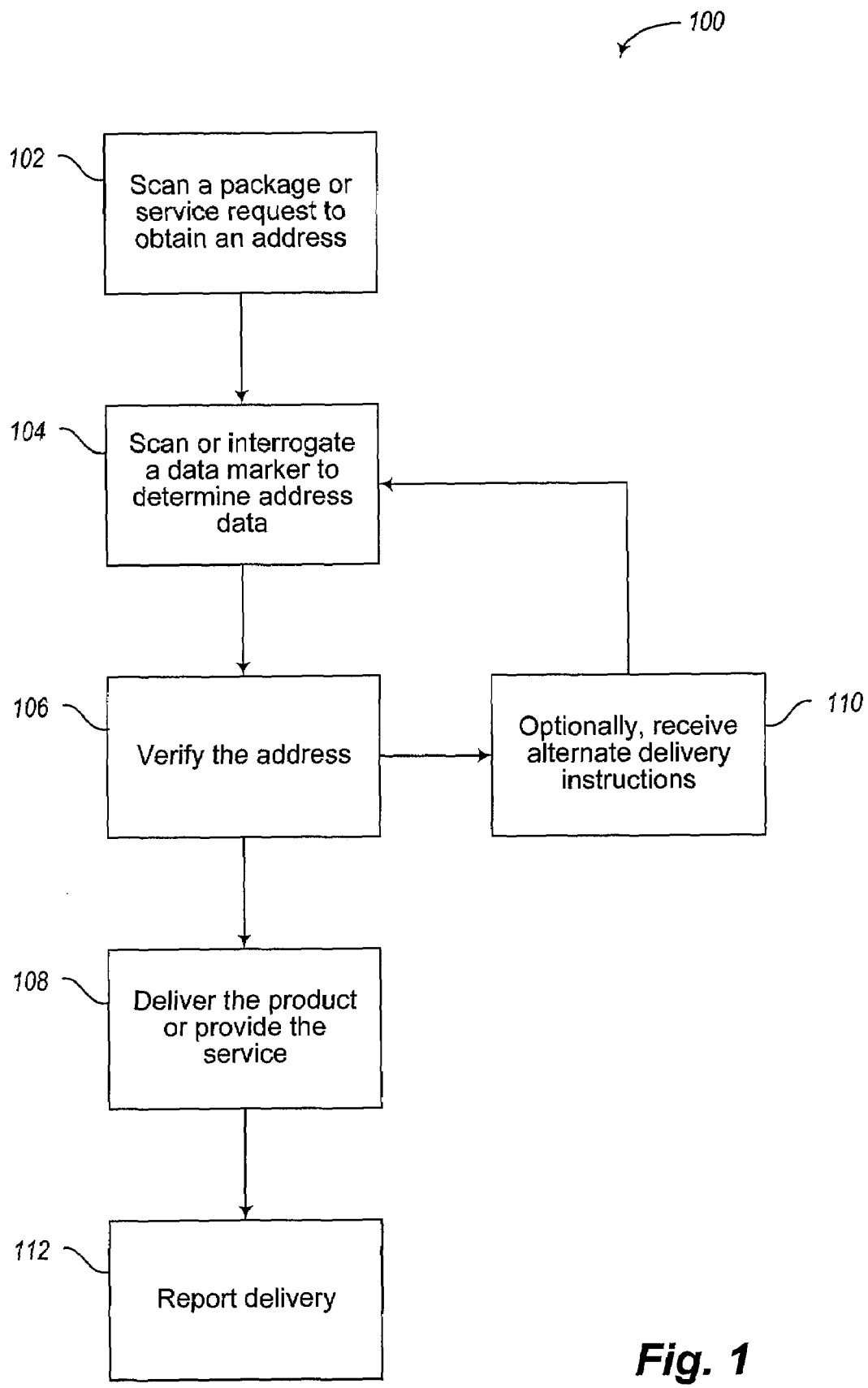
FIG. 1 is a flow chart of a process to track and deliver a package or a service request according to one illustrated embodiment.

A data marker may include a barcode and/or RFID device for verification of a physical address of a residence, business or location. A home, business, building or location may be supplied with one or more data marker(s) such as a bar code and/or RFID device. A data marker may carry address data of a location with which the data marker may be associated. The data marker, or another data marker, may contain additional information such as owner data, business name data, resident data, employee data, equipment data, utility data, floor plan or layout data, medical data and/or other information.

In some embodiments, a data marker may be placed on or in a building, or may be remote from the building. The data marker may be on the exterior of a building, or in a lobby. In some embodiments, each department, or unit, of a building may have a respective data marker. If a data marker is remote from a location, the data marker may be in relatively close proximity to the building or location so that a service provider can easily identify the location. The data marker may be on a curb, on the mailbox, on a post, on a gate or other accessible position. In a gated community or large facility with several buildings, there may be a first data marker outside the complex and then additional data markers for each building or location within. Data markers may be placed in easily accessible and readily visible positions so that service personnel may locate them rapidly and easily.

A data marker may store more information than just address data associated with a location. For example, a data marker may store company or family name. For a multifamily building or office building with more than one tenant, a data marker may include information about the tenants, departments, and/or the location of a respective department, suite or apartment number. Furthermore, there may be further data markers outside each office or department office.

A data marker may carry or store information about an individual or individuals in a home. For example, a data marker may carry or store information such as whether there are children, whether anyone has a handicap or any special medical needs at a location. Upon arriving at the location, the fire department, EMTs or other emergency personnel may scan the data marker to access important information.

In some embodiments, a data marker may be used to access a locked firebox, a secure building, etc., which emergency personal currently access with a key. A data marker may be electronically connected to a lockbox, or door, and automatically unlock the lockbox, or door, upon interrogation by an appropriate signal.

A data marker may carry or store information related to a number of employees at a facility. In some embodiments, a data marker may be a read/writable RFID, and information such as employee information or utility information may be automatically updated. For example, a data marker may be updated daily to indicate the employees and guest in the facility on a particular day and/or the status of various systems such as the sprinkler system. For example, a data marker or a system of data markers may be automatically connected to electronic access cards and may be updated based on who leaves or enters a facility. In some embodiments, a data marker may be updated more or less frequently than daily.

A location or building may have more than one data marker. For example, there may be a data marker that delivery persons may read, another that service providers may read and another that emergency personnel may read.

A person providing a service would use a data marker to verify a service/delivery address and other pertinent information. The data marker may be used by delivery persons, repairpersons, utility persons, fire, police, and other emergency personnel.

FIG. 1 shows a process 100 that may be implemented to track and deliver a package or service. For the sake of clarity, FIG. 1 is described in the context of a company C1 ordering a piece of equipment and the equipment is to be delivered to an address A1.

At 102, the driver scans/interrogates the address on the equipment packaging or invoice (using the barcode and/or RF device) to confirm the name of the company C1 and address A1 where the delivery is to be made. This information is entered into or stored in a handheld device.

At 104, the driver scans/interrogates the data marker at the delivery location and obtains address data indicative of an address associated with a location.

At 106, the driver and/or the scanner verifies that the delivery address and the address associated with the location are the same. If there is a match, the equipment is delivered at 108. However, if the verification fails, then the data marker may provide alternate delivery instructions at 110. The alternate instruction could instruct the item to be delivered to an alternate address, left in a delivery location or left with an alternate person. If alternate delivery instructions are received, the process reverts back to block 104 and the driver can scan or interrogate the data marker at the alternate location to verify that the alternate location is the correct delivery location. At 112, delivery may be confirmed and a report sent immediately to the equipment manufacturer.

Postal Service, UPS, FedEx, grocery delivery, florist, food-delivery, catalog orders and other deliveries may verify an address of a delivery by scanning a data marker prior to making a delivery. Information could be stored in data marker authorizing the US Post Office, United Parcel Service, Federal Express, or another delivery service to leave packages with designated people or in a designated location.

A data marker carrying (storing) address data indicative of an address associated with a location may help in billing. It will be useful in tracking goods, damaged goods and/or claimed non-receipt of goods. Reports can be generated quickly, such as with wireless communication, if the delivery person has the capability As another non-limiting example, if an equipment owner or lessee makes a service call, the repairperson could scan/interrogate a data marker to confirm the he or she is at the address where the repair is needed. The data marker may contain information about the layout of the facility and/or the location of various large pieces of equipment. For example, in a residential building sometimes each individual unit has its own equipment, other times there is common equipment and sometimes it is a combination of equipment in an individual apartment and equipment in a common location. Thus, it would be useful for the cable repairperson to know that the cable junction boxes are located in storage closets on floors 2 and 5. A meter reader could scan the home ID and the meter settings to determine usage. This could be uploaded to the gas or electric company. The data marker may also be downloaded for immediate billing. Other service providers such as home-health, meals-on-wheels, carpet cleaners, and cleaning services could scan a data marker to ensure that the service provider is at the correct home. The scanned information can be used for billing purposes to ensure that a bill goes to a correct address rather than a wrong address due to human error in keying in the address. Accurate records could be kept of the time on the job by having a service provider scan the data marker as they enter and leave the property. For home-health, a data marker may carry/store data indicative of insurance, recent treatments or other health information.

In some embodiments, a data marker may be a read/write RFID device. Data stored in the RFID device may be automatically updated to include the most recent treatment information as the health-care provider leaves. The updated information may assist a subsequent health-care worker coming to visit a patient. A report may be generated and sent to the patient's treatment providers and doctors.

Figure 2:
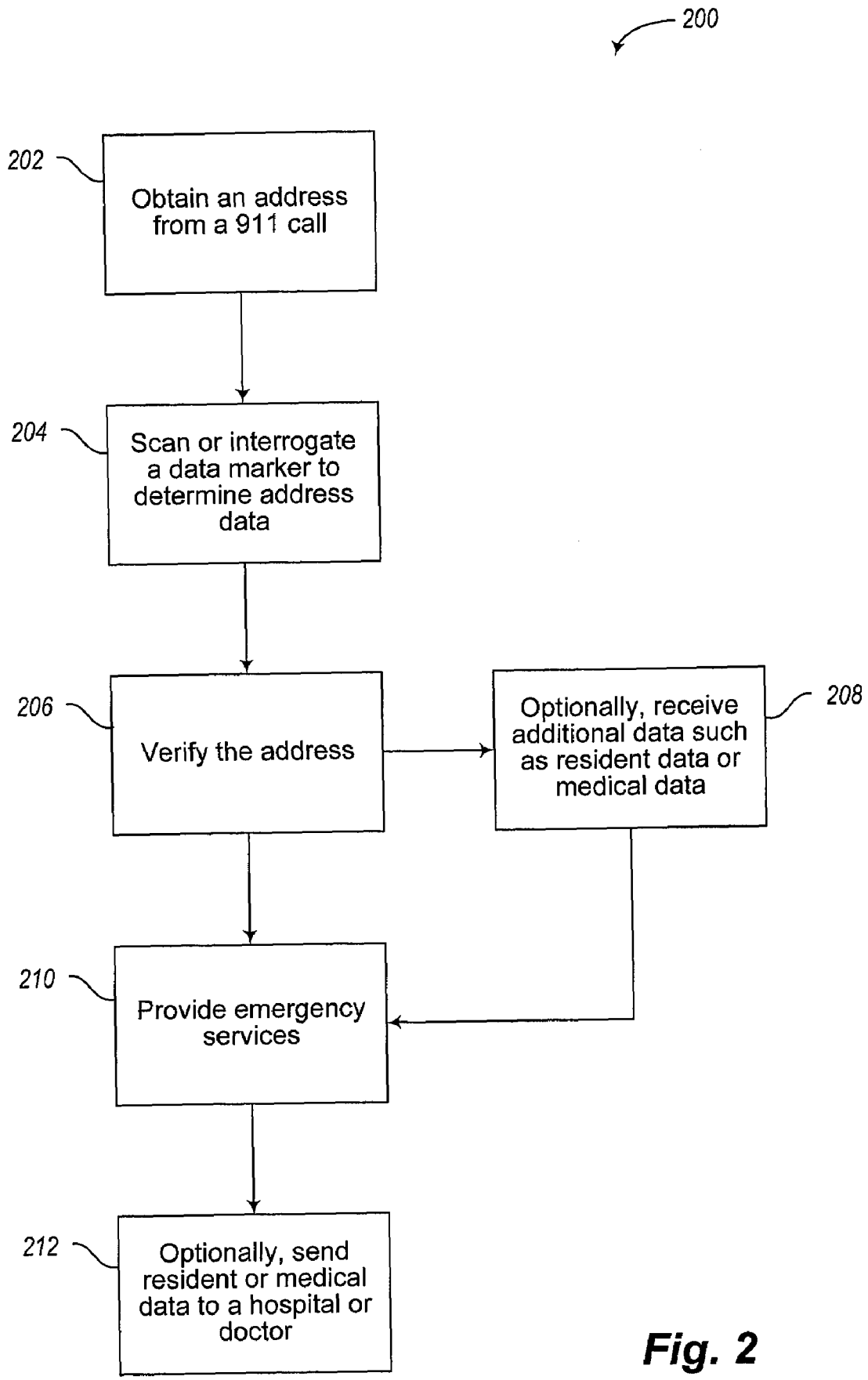
FIG. 2 is a flow chart of a process to provide emergency service according to one illustrated embodiment.

FIG. 2 shows a process 200 that may be implemented to provide emergency services. At 202, an emergency call is received. An address may be automatically obtained such as by the emergency call being a 911 call for which an address of the caller is automatically provided to an operator receiving the emergency call. Alternatively, an address may be obtained by the caller identifying the location. A code for the service required, for example, a paramedic call is generated and sent to the appropriate service provider. The ambulance, fire truck, police or other service provider travels to the location.

At 204, a data marker at the location may be scanned/interrogated to obtain address data indicative of an address associated with the location.

At 206, the location address is verified. Additional data may be stored on the data marker.

At 208, additional data may be retrieved by the emergency personal, such as for example, if any of the resident's has any special medical needs or allergies.

At 210, emergency services are provided. For example, if the service provider was an EMT, paramedic, or ambulance driver, the patient would be attended to and transported to a hospital.

At 212, resident data or medical data may be sent to a doctor or a hospital. Because information about the residents and any important health information could be stored as part of the marker, the hospital could immediately have patient data. When the paramedics return to the fire station, a report could be automatically generated. Data could be transferred using RF, IR or, linked technology or any other upload or download method.

As another non-limiting example, if the emergency call were for a fire at a building, data indicative of a number of residents, whether there are any children, the location of bedrooms, etc. would be useful to the emergency personnel in quickly evacuating the building. In responding to a fire, the firefighters would be able to scan a data marker and learn information to assist them in saving lives.

In responding to an emergency, the emergency service provider would be able to scan a data marker. The service provider may use a scanner and the data marker to obtain the address associated with the location, assess the number of potential victims, send information to a database, determine the closest hospital or the closest hospital with patient capability, evaluate the severity of the wounds, and/or transport victims to prevent overload of hospital resources. For example, specific injuries may be best treated at a specific location. This information could be used to transport the victims.

In some embodiments, a data marker may be included in identification such as a passport, driver's license, military identification tag, or other identification. Data markers may be interrogated such as a batch interrogation of all passengers getting off an airplane and it could be quickly determined if a more detailed screening was needed. Data markers may be used to track patients, at crime scenes or bio-terror scenes, a location of an event, transporting victims and determine how best to distribute emergency services.

Merchants can use data markers. A data marker may be attached to or embedded in merchandise or merchandise packaging. When a consumer selects the merchandise, the customer or merchant may scan selected merchandise or place an order on line. If the customer is purchasing large or bulky items at, for example, a warehouse, store information may be sent wirelessly from a scanner to a cash register to facilitate checkout. A receipt may be sent to the warehouse dock and/or appropriate merchandise departments to gather the purchased merchandise. If the item was to be assembled by store personnel, that request could be relayed to the appropriate department.

In some embodiments, a receipt may include a data marker such as a bar code or RFID chip on it. Store security or other store personnel could scan or read the receipt as the customer exits the shopping floor portion of the warehouse store or if the customer purchased the product online and printed a receipt with a bar code, the receipt could be scanned as the customer enters the parking lot. If the customer has an RFID device, or the like, on his car or ID, the RFID device may be read as the customer enters the parking lot.

A wireless or other signal may be sent to a loading dock letting dock personnel know the customer has left the store, entered the parking lot, or entered the pick-up area and will be driving to the dock to pick up his or her merchandise. The merchandise could be brought to the loading dock. A data marker on the merchandise and the data marker on the receipt could be read to verify that the merchandise matches what the customer purchased. This would prevent loading the wrong merchandise in the customer's car. A further RFID device on the customer car or ID could be scanned to ensure that the customer who purchased the merchandise or his authorized representative is the one making the pickup.

In another embodiment, a customer wanting a specific amount of something could scan a data marker such as an RFID device embedded in the item or item packaging or container. When the amount of product is ready, it could be scanned and transferred to the register for easy checkout. For example, if the customer wants 2.5 yards of fabric, 10 pounds of ground beef, or a specific quantity of nails, he could scan the item and input the amount he or she wants.

In some embodiments, data markers may be used as security measures to prevent loss or theft of merchandise, equipment or tools. A person or business owner may place a data marker on items like computers, stereo equipment, tools, appliances, etc. The data marker may store/carry a company or owner address, product information, serial number, lessor and/or lessee information, service information, and other information. In addition, if the merchandise was taken an alarm could sound. If the item were later being sold, or if rented, returned to the lessor, the product may be scanned to verify that it was the original product. The police may scan the data marker if the item were recovered. A pawnshop may scan the data marker on merchandise to ensure that the owner was the person pawning the item. If the item was stolen, the police could be contacted and the item returned to the owner.

In some embodiments, an animal may be tagged. A data marker in an animal allows the match-up of a residence and an animal. An officer or other person may scan the data marker in the animal. The officer could then go to the location associated with the data marker in the animal and scan the data marker at the location to verify that this location is the animal's home. The pet and owner could be reunited. In the case of an injured pet, the pet could be transported to the veterinarian and the vet could scan the pet for billing purposes.

I claim:

1. A method to determine an actual address of a location before providing a service at a desired location having a specified address, comprising:
   acquiring address information indicative of a first location from a first data maker fixedly disposed at least proximate to a first location prior to arrival of a service provider at the first location;
   verifying an actual address determined from the address information indicative of the first location is the same as the specified address; and
   providing a service by the service provider in response to the verification of the actual address and the specified address being the same address.

2. The method of claim 1 wherein acquiring address information indicative of a first location from a first data maker fixedly disposed at least proximate to a first location prior to arrival of the service provider at the first location comprises, electronically acquiring from the fixed data maker information indicative of one or more of the following: address data, owner data, business name data, resident data, employee data, equipment data, utility data, facility data, floor plan data, building layout data, department data, unit data, delivery data, and medical data.

3. The method of claim 1 wherein providing a service by the a service provider in response to the verification of the actual address and the specified address being the same address comprises, delivering an item addressed to the specified address to the location.

4. The method of claim 3, further comprising:
   electronically reading information from a label associated with the item to be delivered; and
   determining the specified address from the electronically read information.

5. The method of claim 4 wherein the label is at least one of a shipping label, a bar code label, an RFID device, a bill of lading, an invoice, a delivery ticket, a delivery order, a freight manifest, a check, a shipping note, or delivery instructions.

6. The method of claim 3 further comprising reporting delivery of the item.

7. The method of claim 3 comprising:
   electronically acquiring delivery instructions from the first fixed data marker; and
   delivering the item to a location and/or a recipient designated by the delivery instructions.

8. The method of claim 1 wherein providing a service by a service provider comprises answering a request for an emergency service.

9. The method of claim 8, further comprising:
   obtaining the specified address from a 911 call.

10. The method of claim 9, comprising:
    electronically acquiring resident data and/or medical data from a second fixed data marker fixedly disposed proximate to the first location.

11. The method of claim 10 further comprising:
    transmitting resident data and/or medical data to a hospital or medical provider.

12. The method of claim 10 further comprising:
    generating a report; and
    transmitting the report after providing the service.

13. The method of claim 8 further comprising:
    providing an emergency services signal to the first data marker; and
    obtaining access to the location in response to verification of the emergency signal.

14. The method of claim 1 wherein providing a service by a service provider in response to the verification of the actual address and the specified address being the same address comprises at least one of servicing equipment or repairing equipment.

15. The method of claim 14 further comprising:
electronically reading information from a second data marker fixedly disposed at least proximate to the location with an RFID device reader or a bar code reader;
electronically obtaining data indicative of at least one of the following utility data, equipment data or floor plan data based on the information electronically read from the second data marker.

16. The method of claim 1 further comprising:
finding the data marker at least proximate to the first location, wherein the data marker is fixedly disposed at least proximate to the first location prior to arrival of a service provider at the first location.

17. A method to determine whether a service provider is at a specified location for which a service should be provided, comprising:
arriving at the first location by a service provider of the service;
finding at least one fixed data marker that includes address data indicative of the first location address and optionally one or more of the following owner data, business name data, resident data, employee data, equipment data, utility data, facility data, floor plan data, building layout data, department data, unit data, delivery data, and medical data at least proximate to the first location, wherein the at least one fixed data marker is fixedly disposed at least proximate to the first location prior to arrival of the service provider at the first location,
wherein the at least one fixed data marker is a bar code, an RFID device, or the bar code and the RFID device;
electronically scanning or interrogating the at least one data marker by the service provider to obtain the address data indicative of the first location address;
verifying that an address for the specific location matches the first location address; and
providing of the service by the service provider at the first location in response to verification that the first location address matches the address for the specific location.

18. The method of claim 17 wherein providing of the service by the service provider at the first location in response to verification that the first location address matches the address for the specific location comprises:
scanning, reading, or interrogating a label associated with an item to be delivered, wherein the label is an address, a shipping label, a bar code label, an RFID device, a bill of lading, an invoice, a delivery ticket, a delivery order, a freight manifest, a check, a shipping note, or delivery instructions;
delivering the item at the first location; and
reporting delivery of the item.

19. The method of claim 17 wherein the service is an emergency service, and further comprising:
obtaining the address of the specific location from a 911 call.

20. A method of provisioning of at least one service at a desired location by a service provider, comprising:
electronically acquiring address information indicative of an address of a first location from a first fixed data marker;
determining an actual address for the first location based upon the electronically acquired address information; and providing at least one service at the first location by the service provider in response to a determination that the actual address of the first location matches a specified address of the desired location.

21. The method of claim 20, comprising:
finding the first fixed data marker at least proximate to the first location by the service provider.

22. The method of claim 20 wherein electronically acquiring address information indicative of an address of a first location from a fixed data marker comprises:
scanning the first fixed data marker at least proximate to the first location with a bar code reader.

23. The method of claim 20 wherein electronically acquiring address information indicative of an address of a first location from a fixed data marker comprises:
interrogating the first fixed data marker at least proximate to the first location with an RFID device reader.

24. The method of claim 23, comprising:
receiving access to a secure facility at the first location by the service provider in response to the interrogation of the first fixed data marker having an appropriate signal.

25. The method of claim 24 wherein receiving access to a secure facility at the first location by the service provider in response to the interrogation of the first fixed data marker having an appropriate signal comprises at least one of:
acquiring a key for the secure facility from a box that is automatically unlocked in response to interrogation of the first fixed data marker having the appropriate signal by the service provider; or
finding a door to the secure facility that is automatically unlocked in response to interrogation of the first fixed data marker having the appropriate signal by the service provider.

26. The method of claim 20, comprising:
prior to providing at least one service at the first location, electronically acquiring from a second fixed data marker location specific information indicative of at least one of: a number of persons currently within a facility at the first location; status of a sprinkler system at the first location; tenants of the facility at the first location; departments of a business at the first location; and medical information of at least one person; and authorization for the service provider to deliver an item addressed to the first location to a designated person or a designated location.

27. The method of claim 26 wherein the first fixed data marker and the second fixed data marker are the same data marker.

28. The method of claim 20, comprising:
prior to providing at least one service at the first location, electronically acquiring location specific information indicative of an aspect of a facility at the first location from a second fixed data marker.

29. The method of claim 28 wherein the first fixed data marker and the second fixed data marker are the same data marker.

30. The method of claim 20, comprising
fixedly disposing the first fixed data marker at least proximate to the first location prior to arrival of the service provider at the first location, and wherein prior to arrival of the service provider, the first fixed data marker carries at least address information indicative of the address of the first location.

* * * * *